United States Patent [19]

Gay

[11] 3,779,208

[45] Dec. 18, 1973

[54] APPARATUS FOR HANDLING ROLLED BALES OF HAY

[75] Inventor: James E. Gay, Vinton, Iowa

[73] Assignee: Starline, Inc., Harvard, Ill.

[22] Filed: Aug. 2, 1972

[21] Appl. No.: 277,322

[52] U.S. Cl............................ 119/1, 119/51, 172/19
[51] Int. Cl............................................. A01k 29/00
[58] Field of Search ................... 119/1, 51; 172/19; 56/DIG. 2

[56] References Cited
UNITED STATES PATENTS
2,778,292  1/1957  Kavan................................. 172/19

Primary Examiner—Hugh R. Chamblee
Attorney—Axel A. Hofgren et al.

[57] ABSTRACT

Apparatus for handling rolled bales of hay, and especially those rolled on the ground from a windrow of hay, which includes a frame that may be mounted on a farm tractor and that includes a roller for unrolling a bale onto the ground so that livestock may feed on the hay in the unrolled bale. In one form of the apparatus the unrolling means also forms part of a bale transporting fork lift device.

14 Claims, 8 Drawing Figures

PATENTED DEC 18 1973 3,779,208
SHEET 3 OF 3

APPARATUS FOR HANDLING ROLLED BALES OF HAY

BACKGROUND OF THE INVENTION

Several devices have recently come on the American market for producing large, rolled bales of hay by rolling a windrow or swath in contact with the ground. The first known apparatus for forming bales of hay in the above described fashion is disclosed in Avery U.S. Pat. No. 3,110,145, issued Nov. 12, 1963. Such apparatus rolls a relatively flat swath of hay spirally into a generally cylindrical bale in which an end of the swath is exposed. Such bales may be quite large, with an individual bale containing as much as one-half to three-quarters of a ton of hay. The bales may be left in the field where they are rolled, or may be picked up by a fork lift mounted on a farm tractor and transported to a storage area where they are piled on top of one another to the limit of the lifting capacity of the fork lift.

One of the ways to utilize such bales of hay for feeding livestock is to unroll the bales in a field so that they form a long, relatively flat swath of hay from which livestock may feed. However, the great size and weight of such bales makes it difficult to unroll them with any equipment normally available on a farm.

SUMMARY OF THE INVENTION

The principal object of the present invention is to provide an attachment for a farm tractor which may be used to unroll a large rolled bale of hay on the ground.

Yet another object of the invention is to provide such an apparatus which, in one form, combines the bale unrolling means with a fork lift for transporting the large rolled bale.

THE DRAWINGS

DETAILED DESCRIPTION OF THE INVENTION

Figure 1:
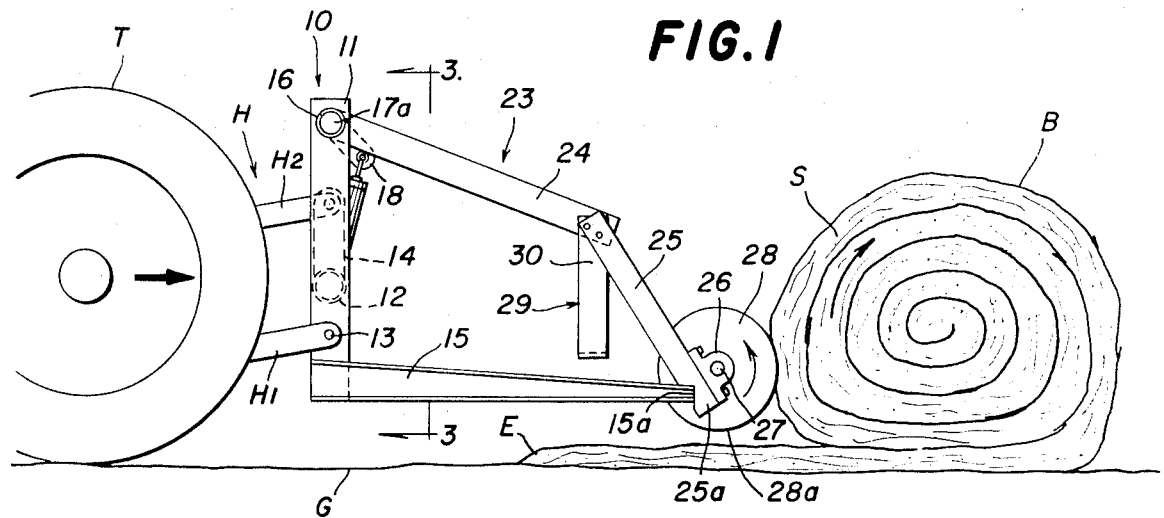
FIG. 1 is a side elevational view of a preferred embodiment of the invention, mounted on the three point hitch of a tractor, and shown as it unrolls a bale of hay on the ground.
Figure 2:
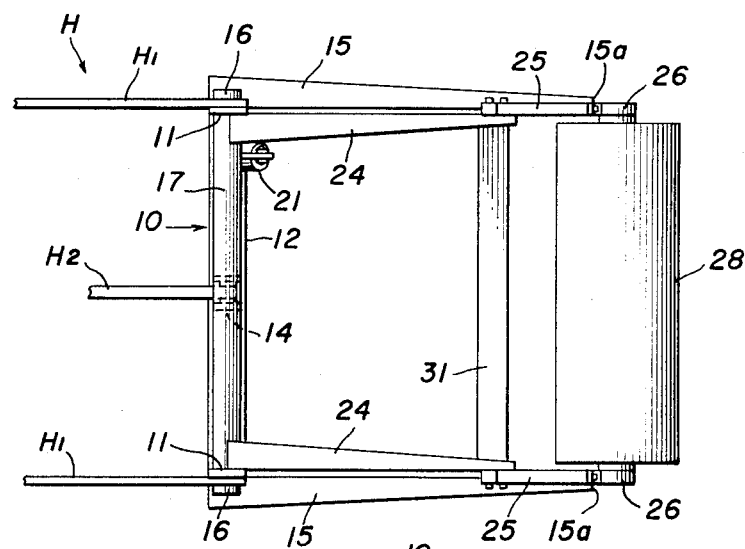
FIG. 2 is a plan view of the apparatus of FIG. 1 with the arms of the three point hitch broken away.
Figure 3:
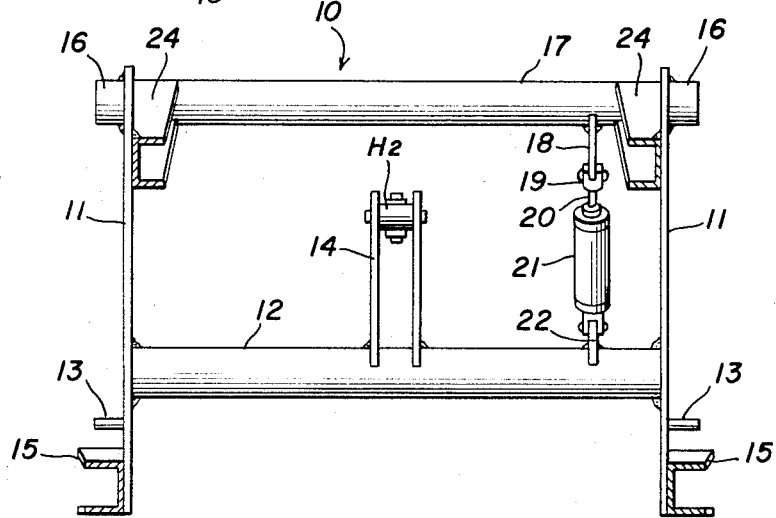
FIG. 3 is a sectional view on an enlarged scale taken substantially as indicated along the lines 3—3 of FIG. 1.

Referring to the drawings in greater detail, and referring first to FIGS. 1 to 5, a farm tractor T has a standard three point hitch, indicated generally at H, which includes the usual lateral lifting arms H1 and central stabilizing arm H2.

The apparatus of the invention includes a frame, indicated generally at 10, that includes upright side frame members 11 which are connected by a tubular cross member 12. Means for detachably mounting the frame 10 on the three point hitch H includes laterally projecting studs 13 at the lower ends of the upright frame members 11 which may be engaged by the hitch lifting arms H1, and a central bifurcated bracket 14 which surmounts the lower cross member 12 and is engaged by the stabilizing arm H2. Thus, the frame 10 may be raised and lowered with respect to the ground by operation of the tractor three point hitch H.

Figure 4:
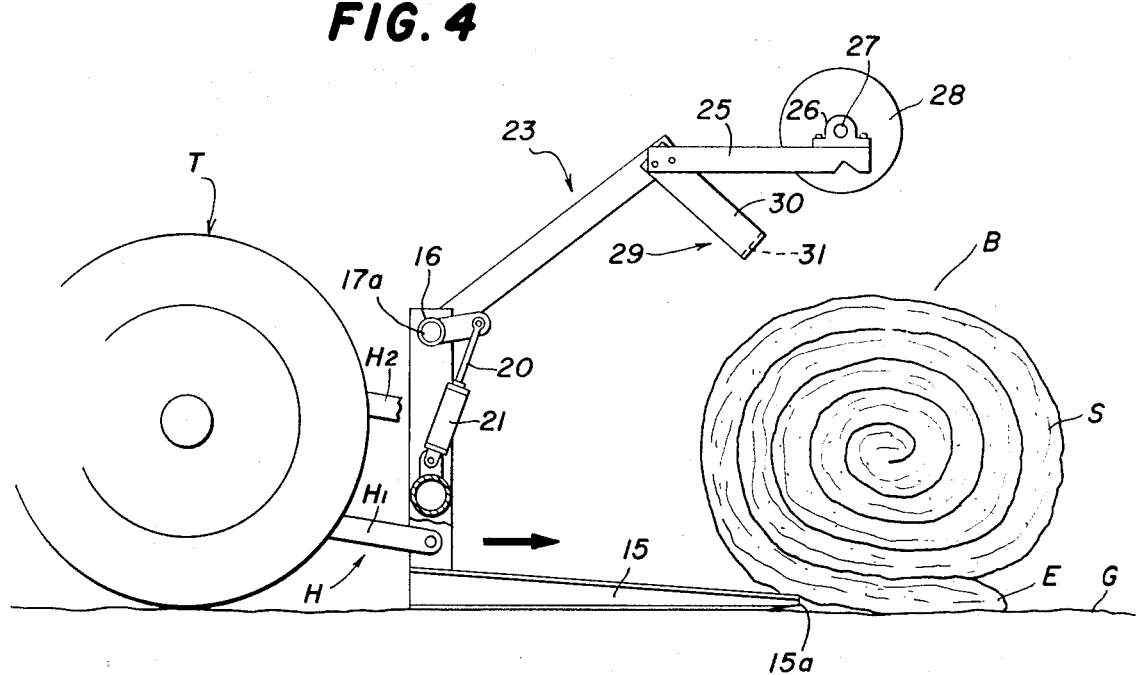
FIG. 4 is a view similar to FIG. 1 illustrating the apparatus in the act of picking up the rolled bale of hay from the ground.
Figure 5:
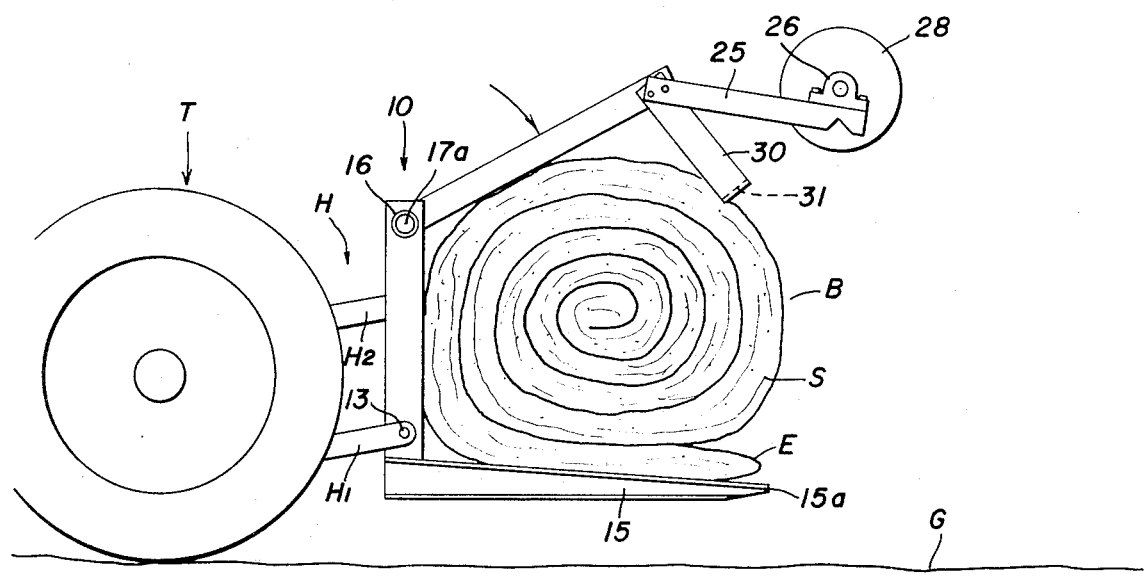
FIG. 5 illustrates the apparatus in a bale transport position.

Rigidly secured to the lower ends of the upright frame members 11 are rearwardly extending fork tines 15 which are tapered toward their tips 15a so that they may be slipped beneath a large rolled hay bale B as illustrated in FIGS. 4 and 5.

The bale B consists of a relatively flat swath S which is rolled spirally into a generally cylindrical bale with an end E of the swath exposed on the ground. The bale B may be rolled either from a windrow or a swath, and may consist of hay or any other fodder crops which are capable of being rolled into the type of bale which is illustrated.

The upper ends of the upright frame members 11 have holes in their upper end portions, and welded to the outer surfaces of the frame members surrounding the holes are short sleeves 16 which provide journals for the reduced diameter end portions 17a of a rotatable shaft 17. A rearwardly extending arm 18 on the shaft 17 receives a bifurcated coupler 19 for the piston rod 20 of a cylinder and piston unit 21 that is pivotally mounted on a bracket 22 on the cross bar 12. Thus, extension and retraction of the piston rod 20 rotates the cross shaft 17.

Arm means, indicated generally at 23, consists of a pair of rearwardly extending forward arm portions 24 each of which is welded to an end portion of the tubular shaft 17 immediately adjacent one of the upright frame members 11. At the rear ends of the forward arm portions 24 are rearward arm portions 25 which extend diagonally downward from the arm portions 24 so that, in a bale unrolling position of the arm means 23, the outer end portions 25a of the rearward arm portions 25 are immediately adjacent the tips 15a of the fork tines 15. Mounted at the extremities of the rearward arm portions 25 are aligned journal means 26 in which are journalled the ends of a shaft 27 on which roller means 28 is mounted. Accordingly, as seen in FIG. 1, the lower extremity 28a of roller 28 is spaced above the ground G by a distance which is somewhat more than the thickness of a swath S of hay in a rolled bale B. The roller means 28 may be lower than the position illustrated in FIG. 1, but its lower extremity 28a must be spaced above the ground by a distance not materially less than the thickness S of a swath, and the minimum roller setting is adequately illustrated in FIG. 7 of the drawings.

Adjacent the rear ends of the forward arm portions 24 is rigid, depending bale engaging means indicated generally at 29, which consists of a pair of lateral mounting arms 30 and a cross bar 31.

Rotation of the tubular shaft 17 by the hydraulic cylinder and piston means 21 moves the arm means 23 between the unrolling position of FIG. 1 and an elevated position of FIG. 4 in which the cross bar 31 of the bale engaging means 2 is seen to be spaced above the top of a bale B so that the fork tines 15 may be run beneath the bale to pick it up. Thereafter the hydraulic cylinder and piston unit may be partially retracted to the position of FIG. 5, where the bale engaging cross bar 31 grips the rear, upper portion of the bale B to hold it on the fork tines 15.

A bale B lying on the ground with its swath end E exposed may be unrolled by guiding the tractor T to place the roller 28 in contact with the cylindrical surface of the bale above the exposed end of the swath, as seen in FIG. 1, and then moving the tractor toward the bale to cause the roller 28 to unroll the bale on the ground.

Figure 6:
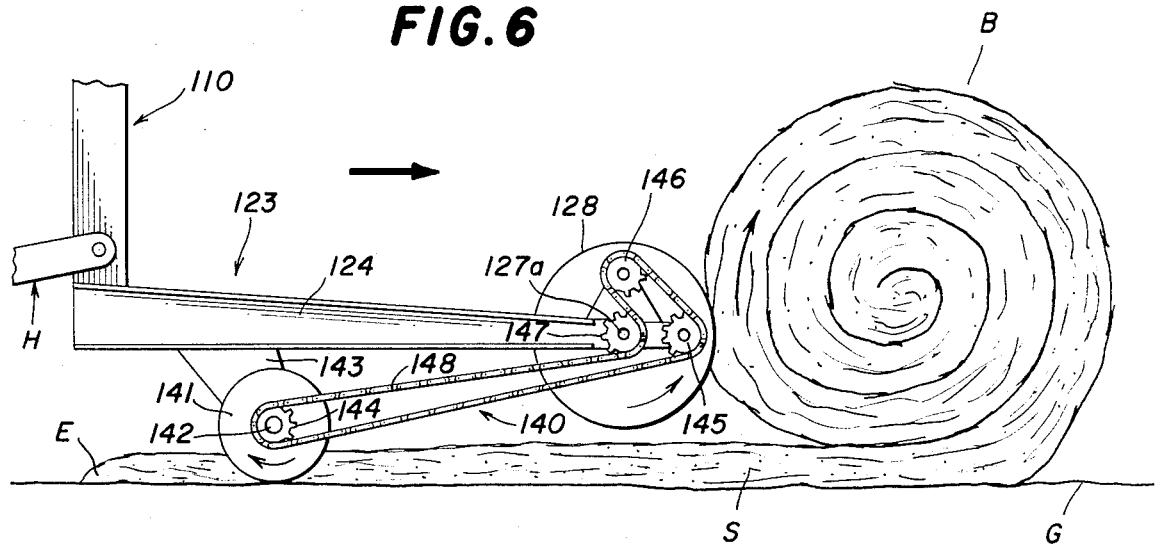
FIG. 6 is a side elevational view of a second embodiment of the invention as it unrolls a bale of hay on the ground.

Turning now to the second embodiment of the invention illustrated in FIG. 6, a frame 110 is mounted upon the three point hitch H of a tractor and includes arm means, indicated generally at 123, in the form of a pair of rearwardly extending parallel arms 124 which are rigidly connected to opposite sides of the lower end of the frame 110. Journal means at the outer ends of the arms 124 supports a shaft on which roller means 128 is fixedly mounted, and an end portion 127a of the shaft projects laterally outwardly beyond the journal means and the arm 124 where it may be connected to drive means, indicated generally at 140.

The drive means 140 includes a ground engaging wheel 141 which is journalled on a stub shaft 142 that is carried on a depending leg 143 on the longitudinal arm 124, a sprocket 144 pinned to the wheel 141, idler sprockets 145 and 146, and an input sprocket 147 which is keyed to the projecting end portion of the shaft 127a. A drive chain 148 is trained around the wheel sprocket 144, around the idler sprockets 145 and 146, and wraps partially around the drive sprocket 147 so that rotation of the ground wheel 141 in the direction of the arrow while the apparatus is moving to the right as indicated by the upper arrow in FIG. 6 will cause the roller means 128 to rotate in the direction of the arrow on it, and thus unroll a bale B as the tractor is backed to continue pushing the roller 128 against the bale until the bale is fully unrolled.

Figure 7:
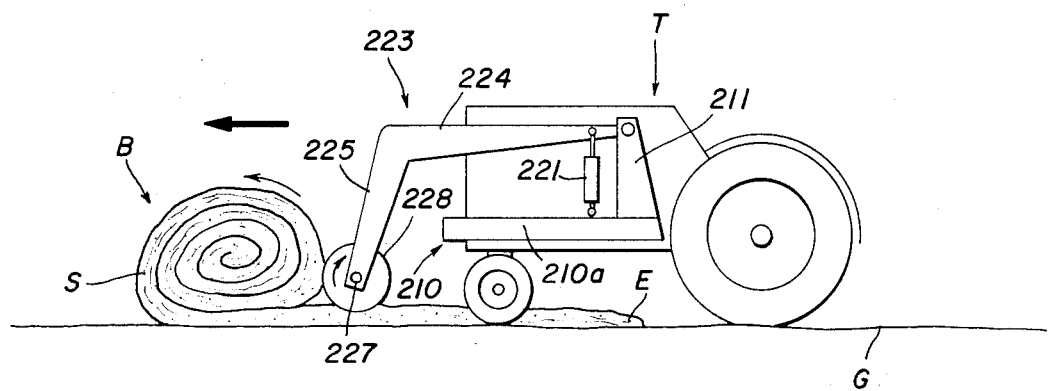
FIG. 7 is a side elevational view of a third embodiment of the invention as it unrolls a bale of hay on the ground.

Referring now to the embodiment of the invention illustrated in FIG. 7, a tractor T supports a frame, indicated generally at 210, which has longitudinal members 210a flanking the two sides of the tractor engine and connected across the front of the tractor, and a pair of standing frame members 211, and pivoted on the upper ends of the upstanding frame members 211 is longitudinally extending arm means, indicated generally at 223.

Figure 8:
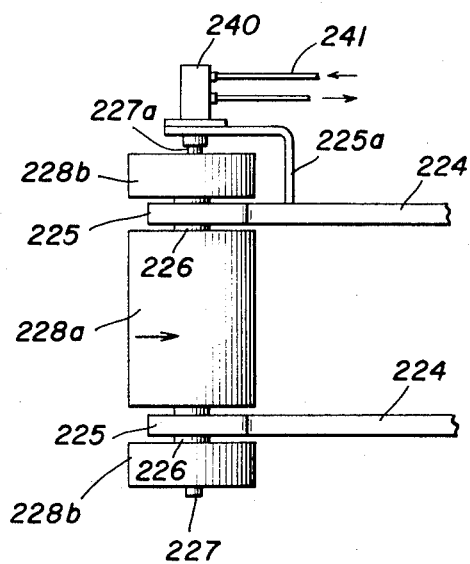
FIG. 8 is an enlarged fragmentary plan view of a modification of the apparatus of FIG. 7 which is provided with a hydraulic motor drive.

The arm means 223 includes an arm 224 at each side of the tractor which extends forwardly therefrom and has a diagonally downwardly and forwardly extending forward arm portion 225. Journal means 226 at the extremities of the forward arm portions 225 support a cross shaft 227 on which roller means 228 is fixedly mounted. As seen in FIG. 8, the roller 228 may include a central roller section 228a and lateral roller sections 228b in order to extend the roller beyond the relatively narrow span of the arms 224 that are mounted closely adjacent the two sides of the tractor engine.

A cylinder and piston unit 221 is pivotally mounted between the frame member 210a and the longitudinal arm 224 to permit the roller 228 to be raised and lowered with respect to ground level.

In the embodiment illustrated in FIG. 7, as in the embodiment of FIGS. 1 to 5, the roller 228 is not driven, and since it idles its contact with the side of the bale B causes it to rotate in the direction of the arrow. The hay in the swath S is loose enough that the bottom of the roller may contact it, as shown in FIG. 7, without causing reverse rotation of the roller.

In the embodiment of FIG. 8, a bracket 225a projects laterally with respect to an end of the roller and serves to support a hydraulic motor 240 that is directly drivingly connected to an outwardly extending outer end portion 227a of the shaft 227. The hydraulic motor 240 is connected to the tractor hydraulic system, as indicated diagrammatically by the hydraulic conduits 241, and is arranged to rotate the roller segments 228a and 228b, all of which are keyed to the shaft 227, in the direction indicated by the arrow in FIG. 8.

If desired, of course, the forwardly extending arm means 223 may be so positioned that the roller 228 occupies a desired fixed position with respect to a bale B on the ground, in which case the arms 224 may be rigidly connected to the upright frame members 211, rather than being pivoted thereon, and the hydraulic cylinder and piston unit 221 may be eliminated from the apparatus.

The foregoing detailed description is given for clearness of understanding only and no unnecessary limitations should be understood therefrom, as modifications will be obvious to those skilled in the art.

I claim:

1. Apparatus adapted to be mounted on a farm tractor for handling hay bales which consist of a relatively flat swath of hay rolled spirally into a generally cylindrical bale in which an end of the swath is exposed, said apparatus comprising, in combination:

a frame;

means detachably mounting said frame on a farm tractor;

longitudinal arm means carried by said frame, said arm means having a free end portion which is spaced a substantial distance outwardly from an end of the tractor;

transversely aligned journal means in said free end portion;

and roller means rotatably supported in said journal means, the lower extremity of said roller means being spaced above the ground by a distance not materially less than the thickness of a swath of hay in a rolled bale, whereby a bale lying with its exposed swath end on the ground may be unrolled by guiding the tractor to place the roller means in contact with the cylindrical surface of the bale above the exposed end of the swath, and then moving the tractor toward the bale to cause the roller means to unroll it on the ground.

2. The apparatus of claim 1 which includes means for moving the arm means up and down to vary the vertical position of the roller means.

3. The apparatus of claim 1 in which the arm means extends outwardly from the front of the tractor.

4. The apparatus of claim 1 in which the arm means extends outwardly from the rear of the tractor.

5. The apparatus of claim 4 in which the frame includes a pair of upright, parallel members connected by a cross member, the frame mounting means engages the three point hitch of a farm tractor, the arm means comprises a pair of parallel arms each of which extends rearwardly from one of the upright members, and the aligned journal means is in the rear end portions of said arms.

6. The apparatus of claim 5 in which the arms are rigidly connected to the lower ends of the upright, parallel frame members.

7. The apparatus of claim 6 which includes a shaft that has an end portion projecting laterally through one of the journal means, the roller means is keyed on said shaft, and drive means is connected to the projecting end portion of the shaft to rotate the roller means so that its surface moves upwardly in contact with the bale.

8. The apparatus of claim 7 which includes a ground engaging wheel, and power transmission means connecting said wheel to the projecting end portion of the shaft.

9. The apparatus of claim 5 which includes rearwardly extending fork tines rigidly mounted at the lower ends of the upright, parallel frame members, said tines being adapted to be moved beneath a bale by rearward movement of the tractor, in which the parallel arms are pivotally mounted adjacent the upper ends of said frame members for movement between an unrolling position and an elevated position, said arms have forward portions which are slightly shorter than the fork tines and rearward portions which are inclined downwardly from the rear ends of the forward portions so the journal means is at the tips of the fork tines in bale unrolling position, hydraulic means for moving the arms between unrolling position and elevated position, and rigid depending bale engaging means adjacent the rear ends of the forward arm portions, said bale engaging means being above the top of a bale in the elevated position of the arms, said arms being movable to a bale transporting positon in which the bale engaging means grips the rear, upper portion of a bale on the fork tines.

10. The apparatus of claim 1 in which the frame includes laterally spaced members adjacent opposite sides of the tractor, and in which the longitudinal arm means comprises a pair of arms each of which extends outwardly from one of the laterally spaced frame members.

11. The apparatus of claim 1 which includes a shaft that has an end portion projecting laterally through one of the journal means, the roller means is keyed on said shaft, and drive means is connected to the projecting end portion of the shaft to rotate the roller means so that its surface moves upwardly in contact with the bale.

12. The apparatus of claim 11 which includes a ground engaging wheel, and power transmission means connecting said wheel to the projecting end portion of the shaft.

13. The apparatus of claim 11 which includes a motor drivingly connected to the projecting end portion of the shaft.

14. The apparatus of claim 1 in which the roller means idles and is caused to rotate by its surface contact with a bale.

* * * * *